United States Patent [19]

Rogowsky

[11] Patent Number: 4,649,466
[45] Date of Patent: Mar. 10, 1987

[54] METHOD AND CIRCUIT ARRANGEMEANT FOR OPERATING A HIGH VOLTAGE DIRECT CURRENT LINE BETWEEN TWO ALTERNATING VOLTAGE SYSTEMS

[75] Inventor: York Rogowsky, Berlin, Fed. Rep. of Germany

[73] Assignee: Licentia Patent-Verwaltungs-GmbH, Frankfurt am Main, Fed. Rep. of Germany

[21] Appl. No.: 630,396

[22] Filed: Jul. 13, 1984

[30] Foreign Application Priority Data

Jul. 22, 1983 [DE] Fed. Rep. of Germany ....... 3326947

[51] Int. Cl.$^4$ ............................................... H02J 3/36
[52] U.S. Cl. ......................................... 363/35; 363/51
[58] Field of Search ........................ 363/35, 37, 51, 96, 363/87

[56] References Cited

U.S. PATENT DOCUMENTS

| 3,906,335 | 9/1975 | Watanabe et al. | 363/35 |
| 4,222,097 | 9/1980 | Rogowsky . | |
| 4,250,542 | 2/1981 | Bulakhov et al. | 363/35 |
| 4,264,951 | 4/1981 | Konishi et al. | 363/35 |
| 4,320,444 | 3/1982 | Häusler et al. | 363/35 |

FOREIGN PATENT DOCUMENTS 2228042 1/1974 Fed. Rep. of Germany .

OTHER PUBLICATIONS

"BBC-Nachrichten" [BBC News], Oct./Nov. 1970, pp. 295–302.
IEEE Trans. PAS 89 No. 6 (1970) pp. 1120–1126, Kanngiesser, Lips, "Control Methods for Improving the Reactive Power Characteristic of HVDC Links".
IEEE Trans. PAS-91 No. 2 (1972) pp. 549–564, Rumpf, Ranade, "Comparison of Suitable Control Systems for HVDC Stations Connected to Weak AC Systems".

Primary Examiner—Clifford C. Shaw
Attorney, Agent, or Firm—Spencer & Frank

[57] ABSTRACT

A method, and apparatus implementing the method, for controlling the current and voltage of a high voltage, direct current transmission link connected at one end to an alternating voltage system via a rectifier and at the other end to another alternating voltage system via an inverter, wherein a first regulating circuit is connected to a rectifier to regulate one of the direct current and direct voltage output of the rectifier, a second regulating circuit is connected to the inverter to regulate one of the extinction angle of and current through the inverter, and a power regulator provides a signal representing a desired current magnitude to the first and second circuit means. The method includes providing a reference signal which defines a reference value for regulating the direct voltage output of the rectifier; reducing the reference value of the reference signal as long as the alternating voltage in the system connected to the rectifier has a magnitude which lies above a predetermined voltage magnitude and as long as the direct current flowing through the transmission link lies below a given current limit magnitude; and increasing the reference value of the reference signal as long as the alternating voltage in the system connected to the rectifier has a magnitude which lies below the predetermined voltage magnitude and the direct voltage of the transmission link lies below a given maximum voltage magnitude, or as long as the direct current in the transmission link lies above the given current limit magnitude.

6 Claims, 1 Drawing Figure

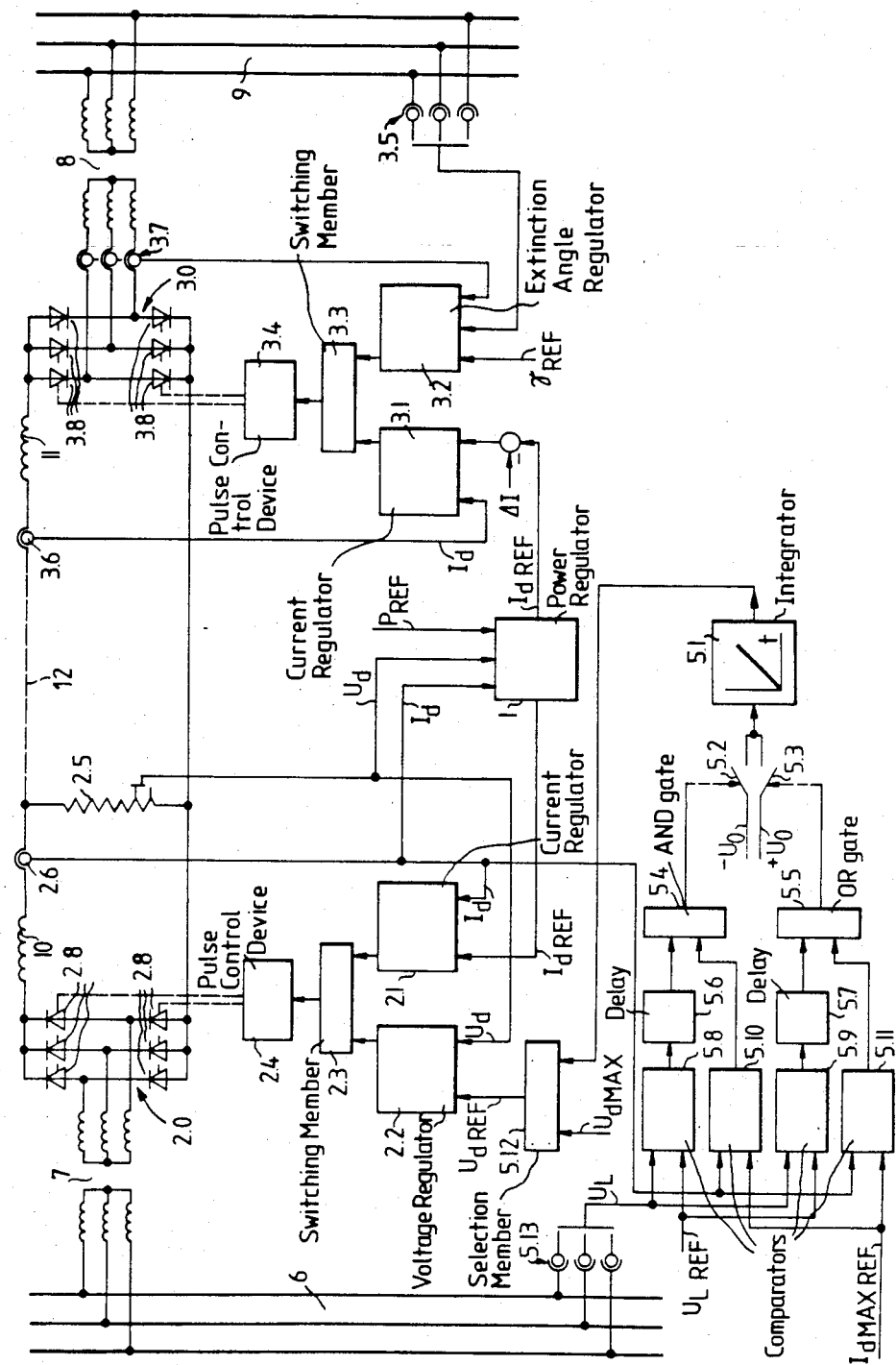

METHOD AND CIRCUIT ARRANGEMEANT FOR OPERATING A HIGH VOLTAGE DIRECT CURRENT LINE BETWEEN TWO ALTERNATING VOLTAGE SYSTEMS

BACKGROUND OF THE INVENTION

The present invention relates to a method for controlling the current and voltage of a high voltage, direct current transmission line connected at one end to an alternating voltage system via a rectifier and at the other end to another alternating voltage system via an inverter, wherein a first circuit is employed to regulate one of the direct current and direct voltage output of the rectifier, a second circuit is employed to regulate one of the extinction angle of and current through the inverter, and a power regulator provides a signal representing a current reference magnitude to the first and second circuits. The invention also relates to a circuit arrangement for implementing the method.

A known regulating system for operating such a high voltage, direct current line is described in "BBC-Nachrichten" [BBC News], October/November 1970, pages 295-302.

In a direct current connection between two alternating current systems, the term HVDC-transmission (high voltage, direct current transmission) is used if a transmission line of considerable length is connected between the rectifier and inverter. If, however, no such line is present, one speaks of a back to back link.

The main purpose of direct current transmission is to transmit active power between the three-phase Referring to the FIGURE, a three-phase transmission system 6 is connected by way of a transformer 7 to a full wave rectifier 2.0 comprising current valves 4 connected in a bridge circuit and being controllable by signals from pulse control 2.4. By way of a high voltage-direct current line 12 which includes inductances 10 and 11, rectifier 2.0 is in communication with an inverter 3.0 comprising current valves 3.8 connected in a bridge circuit and being controllable by signals from a pulse control device 3.4. Inverter 3.0 has its output connected to a further three-phase transmission system via a further transformer 8.

A power regulator 1, provided for regulating the power to be transmitted through line 12, receives a power reference parameter $P_{REF}$, the direct voltage $U_d$ of line 12 obtained by means of a voltage detection device 2.5, and the current $I_d$ of line 12 obtained by means of a current transformer 2.6, and produces at its output a desired current magnitude $I_{dREF}$ which is fed to a rectifier current regulator 2.1 and an inverter current regulator 3.1. The desired current magnitude $I_{dREF}$ is reduced by a marginal current magnitude of $\Delta$ I prior to being fed to current regulator 3.1. Current regulator 3.1 also receives the direct current $I_d$ in line 12 detected by way of a current transformer 3.6 as a regulating parameter. A switching member 3.3 selectively connects current regulator 3.1 or an extinction angle regulator 3.2 to pulse control device 3.4, depending on which one of the current regulator 3.1 and extinction angle regulator 3.2 sets the smaller control angle $\alpha$, where the control angle $\alpha$ is defined to be the electrical angle from the time when the anode voltage of a current valve becomes positive up to the firing instant. The extinction angle $\gamma$ is the electrical angle from the valve current extinction point up to the point that the commutation voltage becomes positive. The extinction angle regulator 3.2 receives an extinction angle reference parameter $\gamma_{REF}$ for the extinction angle $\gamma$ of inverter 3.0 and additional regulating parameters derived from the alternating voltage system 9 by means of a voltage transformer 3.5 and from the output of inverter 3.0 by a current transformer 3.7.

On the side of the circuit arrangement with rectifier 2.0, a switching member 2.3 selectively connects current regulator 2.1 or a direct voltage regulator 2.2 to the pulse control device 2.4 of rectifier 2.0, depending on which one of current regulator 2.1 and direct voltage regulator 2.2 sets the larger control angle $\alpha$. Direct voltage regulator 2.2 receives a reference parameter $U_{dREF}$, which in the prior art system corresponds to a reference parameter $U_{dMAX}$ (described below), to set the maximum permissible direct voltage magnitude in line 12. The regulating parameter $U_d$ is also provided to direct voltage regulator 2.2 from voltage detection device 2.5. Voltage regulator 2.2 is usually needed only to limit the direct voltage output of rectifier 2.0 so as to avoid voltage overload on components. Its reference input $U_{dMAX}$ generally corresponds to 105 to 115% of the rated direct voltage in line 12.

During normal operation, switching member 2.3 operates to connect current regulator 2.1 to pulse control device 2.4 for regulating the firing of the valves 2.8 in rectifier 2.0. Since current regulator 2.1 sets a current in line 12 which is larger by $\Delta I$ than what is set by current regulator 3.1, current regulator 3.1 increases the countervoltage of inverter 3.0 until the output of current regulator 3.1 is replaced by the output of extinction angle regulator 3.2 which determines the highest inverter voltage.

If rectifier 2.0 does not develop sufficient current because, for example, voltage $U_L$ in alternating voltage system 6 is too low, current regulator 3.1 will reduce the control angle $\alpha$ of valves 3.8 and thus reduce the counter-voltage of inverter 3.0 until a current flows in line 12 which corresponds to the desired current parameter $I_{dREF}$.

The magnitude of the three-phase voltage $U_L$ of three-phase system 6 can be influenced by reactive power obtained at the bus bar. Inductive reactive power here produces a reduction in voltage.

Both rectifier 2.0 and inverter 3.0 of the direct current line take inductive reactive power from their a.c. systems which is proportional to the direct current flowing in line 12 and approximately proportional to the sine of the control angle $\alpha$. The control angle $\alpha$ of the rectifier 2.0 can be influenced by way of the direct voltage regulator 2.2, wherein a maximum voltage $U_d$ occurs with $\alpha=0$. With increasing $\alpha$ the voltage $U_d$ becomes lower in that $U_d$ is proportional to $\cos\alpha$.

Direct current links are generally constructed in such a manner that during rated operation the reactive power they require is supplied by capacitors (see, for example, German Offenlegungsschrift [laid-open patent application] No. 2,228,042). If the system operates under partial load, too much capacitive power is present and the three-phase voltage may become too high. In this case, it would be desirable to operate the direct current link with a low direct voltage. Several proposals have already been made to achieve this, most of them effecting operation with a constant power factor (see, for example, IEEE Trans. PAS 89 No. 6 (1970) pages 1120-1126, Kanngiesser, Lips).

The present invention is based on the realization that in direct current links the transmission of the desired active power takes priority. Since this active power has its rated value at full direct voltage and rated current, it is possible to influence the reactive power under partial load. With a partial load and unlimited direct voltage, the power regulator will set a smaller direct current.

SUMMARY OF THE INVENTION

It is an object of the present invention to modify the above-mentioned method in such a way that the advantages of a high voltage, direct current transmission or a back to back link are utilized in a simple manner for regulating the reactive power of the a.c. system connected to the rectifier so that the rectifier arrives at the most constant possible a.c. voltage magnitude.

The above and other objects are accomplished by the invention which provides for a method for controlling the current and voltage of a high voltage, direct current transmission link connected at one end to an alternating voltage system via a rectifier and at the other end to another alternating voltage system via an inverter, wherein a first circuit means is connected to the rectifier to regulate one of the direct current and direct voltage output of the rectifier, a second circuit means is connected to the inverter to regulate one of the extinction angle of and current through the inverter, and a power regulator is connected to provide a signal representing a current reference value to the first and second circuit means. The method includes the steps of providing a reference signal which presents a reference value for regulating the direct voltage output of the rectifier; reducing the reference value of the reference signal as long as the alternating voltage in the system connected to the rectifier has a magnitude which lies above a predetermined voltage magnitude and as long as the direct current flowing through the transmission link lies below a given current limit magnitude; and increasing the reference value of the reference signal as long as the alternating voltage in the system connected to the rectifier has a magnitude which lies below the predetermined voltage magnitude and the direct voltage of the transmission link lies below a given maximum voltage magnitude, or as long as the direct current in the transmission link lies above the given current limit magnitude.

An apparatus according to the invention for implementing the foregoing method of the invention includes a circuit arrangement having a voltage regulator connected to the rectifier for regulating the direct voltage output of the rectifier, and additionally including a first voltage supply for supplying a positive voltage; a second voltage supply for supplying a negative voltage; an integrator having an input and an output arranged to be connected to the voltage regulator for supplying the voltage regulator with a reference signal which defines a reference value and which is used to regulate the direct voltage output of the rectifier; switch means connected to the first and second voltage supplies and to the input of the integrator for selectively coupling a selected one of the positive and negative voltages to the integrator; first comparator means having an output and being connected for emitting an output signal if the magnitude of the alternating voltage of the first alternating voltage system is greater than a predetermined voltage magnitude; second comparator means having an output and being connected for emitting an output signal if the direct current flowing in the transmission link is less than a given current limit magnitude; an AND gate having first and second inputs each connected to a respective one of the outputs of the first and second comparator means and an output connected to the switch means for causing the switch means to couple the negative voltage to the integrator when both output signals emitted by the first and second comparator means are present at the inputs of the AND gate; third comparator means having an output and being connected for emitting an output signal if the magnitude of the alternating voltage of the first alternating voltage system is less than the predetermined voltage magnitude; fourth comparator means having an output and being connected for emitting an output signal if the direct current in the transmission link is greater than the given current limit magnitude; and an OR gate having first and second inputs each connected to a respective one of the outputs of the third and fourth comparator means and an output connected to the switch means for causing the switch means to couple the positive voltage to the integrator means when at least one of the output signals of the third and fourth comparator means is present at an input of the OR gate.

BRIEF DESCRIPTION OF THE DRAWINGS

The sole FIGURE shows a block circuit diagram of an HVDC-transmission with the conventional type of regulating system incorporating a circuit arrangement according to the invention for implementing the method of the invention.

DESCRIPTION OF THE PREFERRED EMBODIMENT

During partial load operation, a higher reactive power can be set for the rectifier than would correspond to the possible minimum reactive power at this partial load. In this way, a considerable contribution is made to keeping constant the voltage in the alternating voltage system 6 connected to rectifier 20. The transmission of active power is not impeded as long as the direct voltage is limited by means of the direct voltage regulator 2.1 until the power regulator 1 has set the rated current again.

Referring to the FIG., reference parameter $U_{dREF}$ which is fed to direct voltage regulator 2.2, is, according to the present invention, present at the output of a minimum value selection member 5.12 which switches the smaller one of two input values to its output. The parameter $U_{dMAX}$ is fed to one input of member 5.12 to set, as customary in the prior art system, the highest possible direct voltage output of rectifier 2.0. The other input to member 5.12, which is able to set lower values than $U_{dMAX}$, is connected with the output of an integrator 5.1. The output voltage of integrator 5.1 can be decreased or increased linearly in time by means of switches 5.2 and 5.3, respectively, which are controlled to selectively connect either a voltage $+U_O$ or $-U_O$ to integrator 5.1. The rate of change of the output of integrator 5.1 is determined by the magnitude of the charging voltage $\pm U_O$, which magnitude can be easily adjusted by known means. The three-phase voltage magnitude $U_L$ measured by means of a voltage transformer 5.13 is compared in comparators 5.8 and 5.9 with a settable voltage reference magnitude $U_{L\ REF}$. If $U_L > U_{L\ REF}$, comparator 5.8 emits an output signal; if $U_L < U_{L\ REF}$, comparator 5.9 emits an output signal. A further comparator 5.10 compares the direct current magnitude $I_d$ in line 12 with a set current limit magnitude, $I_{dMAX\ REF}$, for operation at a reduced direct voltage, and emits a signal as long as $I_d < I_{d\ MAX\ REF}$.

Preferably, the current limit magnitude $I_{d\ MAX\ REF}$ is 0.95 per unit of rated direct current. In order not to interfere with quick changes in power, the value $I_{d\ MAX\ REF}$ at which the direct voltage is reduced no further, can also be set for smaller values than 95%.

Both output signals of comparators 5.8 and 5.10 must act on an AND gate 5.4 so that switch 5.2 can be actuated which sets the output of integrator 5.1 to lower values.

In order to avoid unnecessary adjustments as the result of transient changes in voltage which occur temporarily in three-phase mains when loads are switched in or there is a short-circuit, it is advisable to connect the output of comparator 5.8 by way of a delay member 5.6 connected between comparator 5.8 and AND gate 5.4, which then transmits the output signal of comparator 5,8 to AND gate 5.4 only if the system voltage $U_L$ lasts for a predetermined duration.

If comparator 5.9 reports that the system voltage $U_L$ is too low, its output actuates switch 5.3 via a further delay member 5.7 and an OR gate 5.5 and increases the output voltage magnitude of integrator 5.1 either until the voltage is correct, i.e. the output signal of comparator 5.9 has disappeared, or, if the voltage reference value $U_{LREF}$ cannot be set, so that comparator 5.9 continuously emits an output signal until integrator 5.1 reaches a maximum output voltage which is equal to $U_{dMAX}$.

A comparator 5.11 emits an output signal to OR gate 5.5 if the direct current magnitude $I_d$ has risen above the magnitude $I_{d\ MAX\ REF}$. In this case, power regulator 1 has set a higher magnitude and the voltage limitation must be reduced so that power regulator 1 can set its desired value at $I_{d\ MAX\ REF}$ to the extent that this is possible.

Since, with a limited direct voltage, it is only possible to transmit a power less than rated power with the rated direct current, it is necessary, if it is intended to increase the power, to initially relax the direct voltage limitation. If the time required for this purpose is too long, the direct current limit magnitude $I_{d\ MAX\ REF}$ can be reduced down to a value at which voltage limitation is just still allowed at its value. Thus it will be possible in any case to directly change the power corresponding to a change in current from $I_{d\ MAX\ REF}$ to the rated direct current.

Details of a control unit, which may be employed for pulse controls 2.4 and 3.4 respectively are described, for example, in an article by E. Rumpf and S. Ranade "Comparison of Suitable Control Systems for HVDC Stations Connected to Weak AC Systems" in IEEE-Transactions on Power, Apparatus and Systems, Vol. PAS-91, No. 2, pages 549 to 564.

Details of a regulator unit which may be used, for example, for power regulator 1 are described in relation to FIG. 3 of U.S. Pat. No. 4,222,097 (Rogowsky). Voltage regulator 2.2, current regulators 2.1 and 3.1 and extinction angle regulator 3.2 have similar circuits. Of course, the regulating parameter for the power actually transmitted being one input signal to the power regulator 1 has to be formed in advance by a multiplier multiplying voltage $U_d$ and current $I_d$.

It will be understood that the above description of the present invention is susceptible to various modifications, changes and adaptations, and the same are intended to be comprehended within the meaning and range of equivalents of the appended claims.

What is claimed is:

1. In a system for controlling the direct current and direct voltage of a high voltage, direct current transmission link connected at one end to an alternating voltage system via a rectifier and at the other end to another alternating voltage system via an inverter, wherein a first circuit means is connected to the rectifier to regulate one of the direct current and direct voltage output of the rectifier, a second circuit means is connected to the inverter to regulate one of the extinction angle of and current through the inverter, and a power regulator provides a signal representing a desired current magnitude to the first and second circuit means, a method comprising:
   regulating the direct voltage output of the rectifier with the use of a reference signal which defines a reference value and which is compared with the direct voltage output signal;
   reducing the reference value of the reference signal as long as the alternating voltage in the system connected to the rectifier has a magnitude which lies above a predetermined voltage magnitude and as long as the direct current flowing through the transmission link lies below a given current limit magnitude; and
   increasing the reference value of the reference signal as long as the alternating voltage in the system connected to the rectifier has a magnitude which lies below the predetermined voltage magnitude and the direct voltage of the transmission link lies below a given maximum voltage magnitude, or as long as the direct current in the transmission link lies above the given current limit magnitude.

2. Method as defined in claim 1, wherein said reducing and increasing steps are performed only if the alternating voltage of the system connected to the rectifier deviates from the predetermined voltage magnitude for a predetermined time interval.

3. Method as defined in claim 1, including setting the current limit magnitude so that a quick change in power transmitted over the transmission link can be effected.

4. In a circuit arrangement for controlling the direct current and direct voltage of a high voltage, direct current transmission link connected at one end to a first alternating voltage system via a rectifier and at the other end to a second alternating voltage system via an inverter, wherein a voltage regulator is connected to the rectifier for regulating the direct voltage output of the rectifier, the improvement comprising:
   a first voltage supply for supplying a positive voltage;
   a second voltage supply for supplying a negative voltage;
   an integrator having an input and an output arranged to be connected to the voltage regulator for supplying the voltage regulator with a reference signal which defines a reference value and which is used to regulate the direct voltage output of the rectifier;
   switch means connected to said first and second voltage supplies and to the input of said integrator for selectively coupling a selected one of the positive and negative voltages to said integrator;
   first comparator means having an output and being connected for emitting an output signal if the magnitude of the alternating voltage of the first alternating voltage system is greater than a predetermined voltage magnitude;

second comparator means having an output and being connected for emitting an output signal if the direct current flowing in the transmission link is less than a given current limit magnitude;

an AND gate having first and second inputs each connected to a respective one of the outputs of the first and second comparator means and an output connected to said switch means for causing said switch means to couple the negative voltage to said integrator when both output signals emitted by said first and second comparator means are present at the inputs of said AND gate;

third comparator means having an output and being connected for emitting an output signal if the magnitude of the alternating voltage of the first alternating voltage system is less than the predetermined voltage magnitude;

fourth comparator means having an output and being connected for emitting an output signal if the direct current in the transmission link is greater than the given current limit magnitude; and an OR gate having first and second inputs each connected to a respective one of the outputs of said third and fourth comparator means and an output connected to said switch means for causing said switch means to couple the positive voltage to said integrator means when at least one of the output signals of said third and fourth comparator means is present at an input of said OR gate.

5. A circuit arrangement as defined in claim 4, and further comprising a delay means connected between said first comparator means and said AND gate for passing the output signal of said first comparator means to said AND gate only if the deviation between the magnitude of the alternating voltage of the first alternating voltage system and the predetermined magnitude lasts for a predetermined time interval.

6. A circuit arrangement as defined in claim 4, and further comprising delay means connected between said third comparator means and said OR gate for passing the output signal of said third comparator means to said OR gate only if the deviation between the magnitude of the alternating voltage of the first alternating voltage system and the predetermined voltage magnitude lasts for a predetermined time interval.

* * * * *